No. 608,308. Patented Aug. 2, 1898.
C. P. STEINMETZ.
SYSTEM OF ELECTRICAL DISTRIBUTION.
(Application filed May 22, 1897.)
(No Model.)
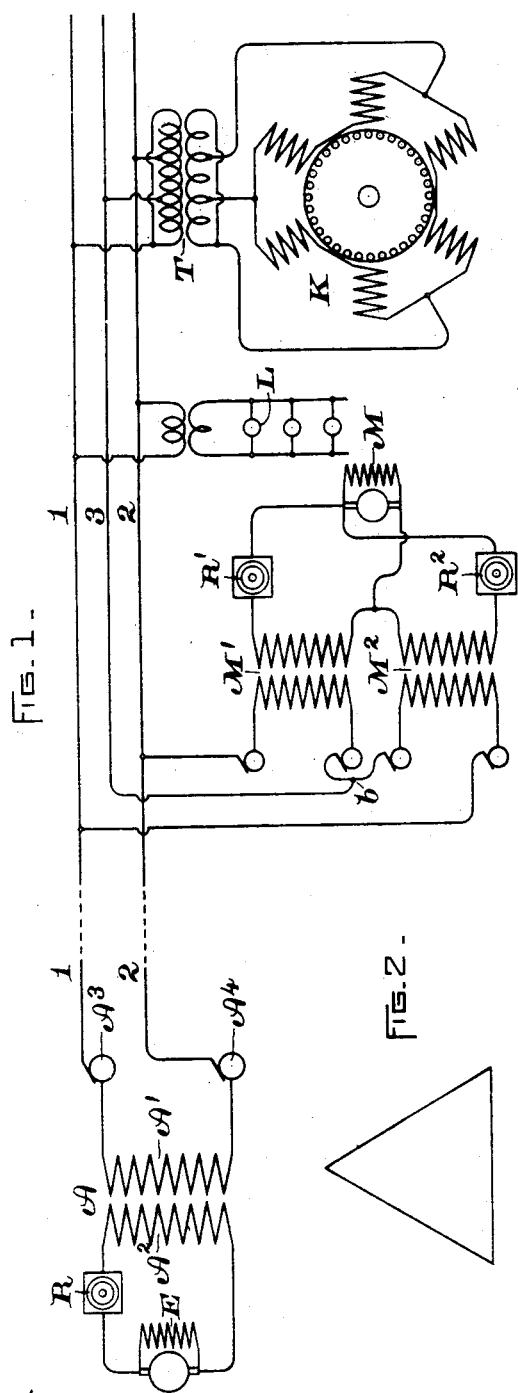
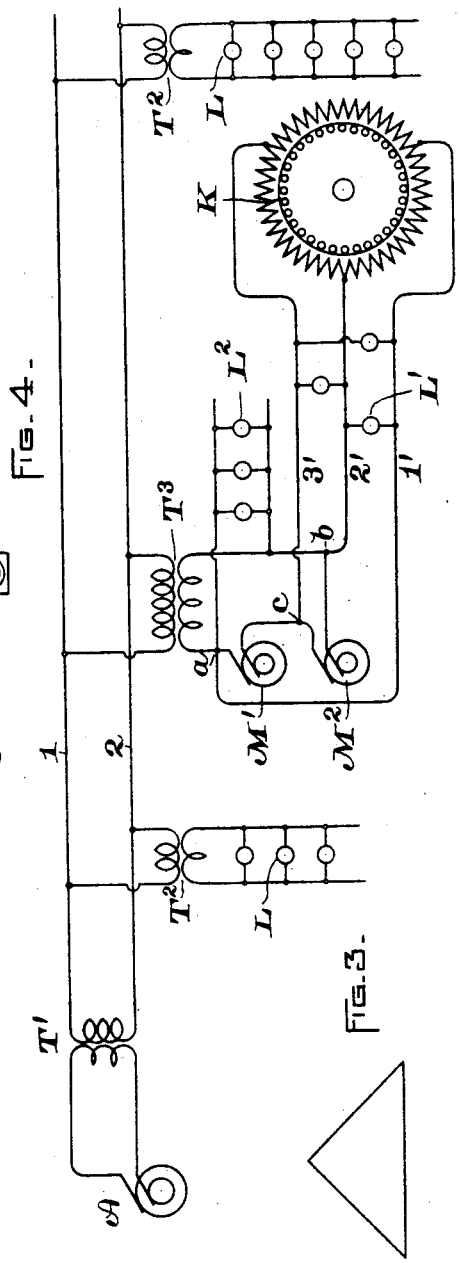
WITNESSES:
A. H. Abell.
A. F. Macdonald.
INVENTOR:
Charles P. Steinmetz, by
Geo. R. Blodgett,
Atty.

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

SYSTEM OF ELECTRICAL DISTRIBUTION.

SPECIFICATION forming part of Letters Patent No. 608,308, dated August 2, 1898.

Original application filed July 14, 1894, Serial No. 517,558. Divided and this application filed May 22, 1897. Serial No. 637,658. (No model.)

*To all whom it may concern:*

Be it known that I, CHARLES P. STEINMETZ, a citizen of the United States, residing at Schenectady, in the county of Schenectady, State of New York, have invented certain new and useful Improvements in Systems of Electrical Distribution, (Case No. 569,) of which the following is a specification.

In my application for Letters Patent for improvements in systems of electrical distribution filed July 14, 1894, Serial No. 517,558, I have shown that a plurality of single-phase dynamo-electric machines free to arrange themselves in any relative phasal relation will, if properly connected, tend to assume such phasal relations that multiphase currents may be taken from them. In my present application, which is a division of the application before mentioned, I apply this principle to commercial purposes in various ways.

To these ends my present invention comprises a method of and apparatus for reacting by means of motors upon a single-phase generator in such a way as to produce multiphase current.

It also comprises a method of and apparatus for producing multiphase current from an ordinary single-phase distribution system by means of motors or generators connected in series across the mains or across the secondary of a transformer fed from the mains and various other features, which will be hereinafter more particularly pointed out and claimed.

In the drawings attached to this specification, Figure 1 is a diagrammatic illustration of an embodiment of my invention. Figs. 2 and 3 are diagrams of electromotive forces, and Fig. 4 is a diagram of my improved system in a slightly-different form.

Referring more particularly to Fig. 1, A is a single-phase alternating-current generator, of which A' is the armature, and $A^2$ the field. The field-winding is excited by a direct-current exciter E, whose output is controlled, as usual, by the rheostat R. From the rings $A^3$ $A^4$ of the generator A wires 1 2 lead to the system of distribution. Lamps L or other single-phase translating devices may be connected to the mains at any desired point.

It will be seen that the system thus far described is the equivalent of any ordinary single-phase distribution system. As is well known, such a system is not well adapted for driving motors. I therefore connect across the mains in series two synchronous machines M' $M^2$, which may be independently-driven generators, but which in the preferred form are ordinary synchronous motors. These machines each consist of an armature and a field-magnet, the fields being excited from a direct-current generator M and controlled by rheostats R' $R^2$. These machines, whether generators or motors, are free to arrange themselves in a multiphase relation with respect to the main generator.

As the main generator A and the two machines M' $M^2$ are in series, they will tend to arrange themselves so that the vector sum of their electromotive forces is zero, or, in other words, so that the vectors which represent their electromotive forces form a closed figure. As in the form shown there are only three electromotive forces acting—namely, the potential difference across the mains due to the generator A and the electromotive forces of the two machines M' $M^2$—the figure is a triangle. As a triangle is fixed when the lengths of the three sides are given, it is evident that the phase relations of the system are stable.

The phase differences between the various electromotive forces may be varied by properly adjusting the magnitudes of the electromotive forces of the various machines. For example, if the three electromotive forces are equal an equilateral triangle will result, as shown in Fig. 2. If, however, one of the electromotive forces—as, for example, that of the generator A—is equal to the square root of two times either of the others, a two-phase system results, as indicated in Fig. 3. As the three electromotive forces acting on the system are thus maintained in a stable multiphase relation, it is evident that multiphase currents may be taken off. In the figure I have shown a third wire 3 leading from the junction $b$ between the two machines M' and $M^2$. If the electromotive forces of the three machines are equal, the wires 1 2 3 will form a symmetrical three-phase system, of which all the energy is supplied from the single-phase generator A. Multiphase motors K may be run on such a system, as usual, through the transformer T, if preferred, and will start under load and run with all the advantages of multiphase machines.

The system shown in Fig. 4 is similar in principle to that already described. A generator A feeds through a step-up transformer T' mains 1 2, which lead to a distributing system. Single-phase translating devices, as lamps L L, may be supplied through ordinary transformers T² T² wherever desired; but where multiphase currents are needed, as for the operation of motors, I prefer to connect in series with the secondary of the transformer T³ two synchronous motors or other synchronous dynamo-electric machines M' M². The secondary of the transformer T³ in this arrangement corresponds with the generator A in Fig. 1 and constitutes a source of electromotive force, which is automatically maintained by the mutual reactions in a multiphase relation with the electromotive forces of the two machines. Connections are made from the junctions $a\,b\,c$ to a distribution system 1' 2' 3', on which multiphase motors K and lamps L' may be run.

I have also shown single-phase translating devices, as lamps, at L², connected to the secondary mains between the secondary of the transformer and the machines M' M². Lamps so placed will not unbalance the system, as they do not affect the current flowing in the mains 1' 2' 3'.

It is obvious that my improvements may be applied to existing single-phase plants and will enable such plants to supply motors and lights over the same wires without expensive changes in their installations by simply placing a pair of motors M' M² at one or more substations and leading wires therefrom to points where power is desired. I also secure by my improvements the advantage of the simplicity and economy of transmission inherent in a single-phase system in combination with the advantages of a multiphase system and am able to run single-phase and multiphase translating devices from the same generators without unbalancing the system.

It will be obvious that where the machines M' M² are generators they may be driven by any suitable power which will leave them sufficiently free to arrange themselves in the required phase relation, and that where they are motors they may act not only as phase-changers, but also to furnish mechanical power, or they may, if preferred, act also as rotary transformers, as is well understood in the art.

It will be seen that various changes may be made without departing from the spirit of my invention. I therefore do not limit myself to the specific forms shown and described; but I claim as my invention and desire to secure by Letters Patent—

1. The method of producing multiphase electromotive forces which consists in generating single-phase current, transmitting it to a distant point, and generating by the action of said current two separate electromotive forces in machines free to adjust themselves to any desired phase relation with the original current, and maintaining by the mutual reactions of the said machines upon each other and upon the original current a polyphase relation between the electromotive forces of the system.

2. The method of producing polyphase currents which consists in generating single-phase current, driving by said single-phase current a plurality of alternating motors in series, and maintaining by the mutual reactions of the machines a polyphase relation between the electromotive forces of the system.

3. The method of producing polyphase currents which consists in generating single-phase current, driving by said single-phase current at a distant point a plurality of alternating motors in series, and maintaining by the mutual reactions of the machines a polyphase relation between the electromotive forces of the system.

4. The combination with a source of alternating electromotive force, of mains leading therefrom to a distant point, a plurality of sources of dephased alternating electromotive force in series across the mains, and connections from the junctions to a multiphase translating device.

5. The combination of a single-phase generator, mains extending therefrom, and two synchronous motors supplied by said mains in series, the electromotive forces of the motors being so adjusted that the reactions of the machines will maintain a polyphase relation between the alternating potential difference across the mains and the counter electromotive forces of the motors.

6. The combination of a source of single-phase electromotive force, a plurality of synchronous motors connected in series with each other and with the said source, the motors being free to arrange themselves in such a way that their electromotive forces will bear a polyphase relation with the electromotive force of the source, and connections from the junctions to polyphase translating devices.

7. The combination of a single-phase alternating generator, a step-up transformer connected thereto, transmission-leads connected to said step-up transformer, and a substation comprising a step-down transformer fed from said leads, and having two synchronous motors connected in series across its secondary, and leads from the junctions to a multiphase distribution system.

8. The method of increasing the number of phases of the current from a source of alternating electromotive force, which consists in combining the electromotive force from said source, in the conductors of a multiphase system, with the dephased electromotive forces of a plurality of synchronous motors, and simultaneously taking off current due to the resultant electromotive forces thus produced, and supplying the said current to multiphase translating devices.

9. The combination with a single-phase alternating-current system of distribution, of a plurality of synchronous motors, means for causing said motors to produce, by a combination of their electromotive forces with the electromotive force of the system, a system of polyphase electromotive forces, and means for supplying current due to said polyphase electromotive forces to translating devices.

10. The combination with a single-phase alternating-current system of distribution, of two synchronous motors connected in series across said system, and connections from said system and from the intermediate points between the two motors to a multiphase translating device.

In witness whereof I have hereunto set my hand this 14th day of May, 1897.

CHARLES P. STEINMETZ.

Witnesses:
   B. B. HULL,
   M. H. EMERSON.